(12) United States Patent
Nowak et al.

(10) Patent No.: US 9,709,117 B2
(45) Date of Patent: Jul. 18, 2017

(54) DAMPENING DEVICE FOR A SURVEYING ROD AND SURVEYING ROD COMPRISING A DAMPENING DEVICE

(71) Applicant: Trimble Jena GmbH, Jena (DE)

(72) Inventors: Matthias Nowak, Jena (DE); Michael Koetzing, Jena (DE)

(73) Assignee: Trimble Jena GmbH, Jena (DE)

( * ) Notice: Subject to any disclaimer, the term of this patent is extended or adjusted under 35 U.S.C. 154(b) by 211 days.

(21) Appl. No.: 14/750,561

(22) Filed: Jun. 25, 2015

(65) Prior Publication Data

US 2015/0292590 A1 Oct. 15, 2015

Related U.S. Application Data

(63) Continuation of application No. PCT/EP2013/065900, filed on Jul. 29, 2013.

(51) Int. Cl.
*G01C 15/06* (2006.01)
*F16F 1/44* (2006.01)
*F16F 1/373* (2006.01)

(52) U.S. Cl.
CPC ............ *F16F 1/445* (2013.01); *F16F 1/3735* (2013.01); *G01C 15/06* (2013.01)

(58) Field of Classification Search
CPC .......... F16F 1/3735; F16F 1/445; G01C 15/06
USPC .......................................................... 33/293
See application file for complete search history.

(56) References Cited

U.S. PATENT DOCUMENTS

| 3,051,425 A | 8/1962 | Homrighausen | |
| 4,202,108 A * | 5/1980 | Adams, Jr. .............. | B44D 3/38 33/379 |
| 5,542,508 A * | 8/1996 | Van Erden .............. | F16F 1/445 188/130 |

(Continued)

FOREIGN PATENT DOCUMENTS

| DE | WO 2015014384 A1 * | 2/2015 | ............ G01C 15/06 |
| JP | 2001 272230 A | 10/2001 | |

OTHER PUBLICATIONS

International Search Report and Written Opinion for PCT Application No. PCT/EP2013/065900, mailed Apr. 22, 2014, 12 pages.

*Primary Examiner* — Yaritza Guadalupe-McCall
(74) *Attorney, Agent, or Firm* — Kilpatrick Townsend & Stockton LLP

(57) ABSTRACT

The dampening device comprises a first member, preferably a tubular member, which is to be positioned at the end of the surveying rod which is to be directed to the ground, a second member, preferably a post, being at least partially slidable directly or indirectly along the first member in a longitudinal direction and for being directly or indirectly connected to a tip which is to be placed on the ground, wherein the first and second members overlap at least in one position at least partially along the longitudinal direction, and at least one elastic dampening member which is directly or indirectly housed by the first and/or second member and disposed such that it is compressed by a movement of the first member and the second member relative to each other in the longitudinal direction, so that mechanical shock exerted to the surveying rod and/or the tip can be dampened by elastic deformation of the dampening member.

15 Claims, 6 Drawing Sheets

(56) References Cited

U.S. PATENT DOCUMENTS

| | | | | |
|---|---|---|---|---|
| 6,502,321 B1* | 1/2003 | Crain | ............... | G01C 15/06 33/293 |
| 6,594,910 B2* | 7/2003 | Wishart | ............... | E04G 21/1808 33/281 |
| 6,688,012 B1* | 2/2004 | Crain | ............... | G01C 15/06 33/295 |
| 6,772,526 B1* | 8/2004 | Crain | ............... | G01C 15/00 33/293 |
| 6,853,909 B2 | 2/2005 | Scherzinger | | |
| 7,441,339 B2* | 10/2008 | Kallabis | ............... | F16M 11/32 33/286 |
| 7,669,341 B1* | 3/2010 | Carazo | ............... | G01C 15/02 33/293 |
| 2005/0050784 A1 | 3/2005 | Bang et al. | | |
| 2009/0260240 A1 | 10/2009 | Bernhard | | |
| 2015/0292590 A1* | 10/2015 | Nowak | ............... | G01C 15/06 33/293 |

* cited by examiner

DAMPENING DEVICE FOR A SURVEYING ROD AND SURVEYING ROD COMPRISING A DAMPENING DEVICE

CROSS-REFERENCE TO RELATED APPLICATIONS

This application is a continuation of International Application No. PCT/EP2013/065900, filed Jul. 29, 2013, the entire contents of which are incorporated herein by reference in their entirety for all purposes.

TECHNICAL FIELD

The present invention relates to a dampening device for a surveying rod and a surveying rod supporting a measurement device and comprising a dampening device.

PRIOR ART

Surveying rods are commonly used for topographical survey and the survey of land and for placing sensitive measurement equipment, for example instruments with optics, circuit boards, cameras and/or panorama cameras for GPS mapping, on the ground. The measurement device may be quite heavy and have about 5 kg, for example.

A surveyor conducts several hundred measurements with such a rod and, thus, positions the heavy optical equipment several hundred times a day. Hence, there is a problem that heavy and sensitive optical equipment provided on top of the surveying rod has to be repeatedly deposited on the ground and lifted again.

Care has to be taken that the delicate and damageable equipment is not misaligned due to the handling of the heavy equipment by the surveyor. In particular, there is a risk that shock or vibration upon positioning the rod on the ground is transferred through the surveying rod and damage is caused to the sensitive measurement equipment. For example, as regards a camera, the shift of a single pixel is to be prevented.

SUMMARY OF THE INVENTION

It is therefore an object of the present invention to provide a surveying rod or to modify a surveying rod such that sensitive measurement equipment provided at one end of the surveying rod is not misaligned or damaged by positioning the surveying rod on the ground.

To solve the above object, there is provided a dampening device for a surveying rod as defined in claim 1. The dampening device comprises a first member, preferably a tubular member, which is to be positioned at the end of the surveying rod which is to be directed to the ground, a second member, preferably a post, being at least partially slidable directly or indirectly along the first member in a longitudinal direction and for being directly or indirectly connected to a tip which is to be placed on the ground, wherein the first and second members overlap at least in one position at least partially along the longitudinal direction, and at least one elastic dampening member which is accommodated or directly or indirectly housed by the first and/or second member and disposed such that it is compressed by a movement of the first member and the second member relative to each other in the longitudinal direction, so that mechanical shock exerted to the surveying rod and/or the tip can be dampened by elastic deformation of the dampening member.

Preferably, the dampening device comprises a tubular member having first and second ends which define a longitudinal direction, wherein the first end of the tubular member is to be positioned inside the surveying rod and the second end of the tubular member is to be positioned at the end of the surveying rod which is to be placed on the ground, at least one elastic dampening member disposed at the first end of the tubular member, and a post having first and second end portions and being at least partially surrounded by the tubular member and slidable in the longitudinal direction inside the tubular member, wherein the first end portion of the post directly or indirectly abuts on the elastic dampening member and the second end portion of the post projects from the second end of the tubular member for being directly or indirectly connected to a tip which is to be placed on the ground, so that vibration exerted on the tubular member, i.e. the rod, is dampened by elastic deformation of the dampening member.

Furthermore, according to the invention, a surveying rod according to claim 14 for supporting a measurement device at one end of the rod and comprising the above defined dampening device at the other end of the rod is provided.

The dampening device of the present invention allows for absorbing shocks and vibrations exerted to the rod and the first member, i.e. the tubular member, so that not only shocks on the surveyor's arm will be absorbed, but also the rod-mounted surveying gear is protected from a hard impact and, thus, shielded from misalignment or damage.

Hence, it is possible to allow for low-vibration use of surveying rods and to repeatedly position sensitive and heavy measurement equipment on the ground without damage. The accuracy of the measurements and the handling for the surveyor is improved.

Additionally, since the second member, i.e. the post, maybe at least partially surrounded by the first member, i.e. the tubular member, and slidable inside the tubular member, no tilting occurs between the tip provided at the second end portion of the post and the rod due to the guidance of the post inside the tubular member.

Moreover, since the elastic dampening member may be provided in the tubular member opposite to the end of the tubular member which is to be placed on the ground and, hence, inside the surveying rod, the elastic dampening member is protected from environmental influences.

Further, it is advantageous that the dampening device can be inserted into one end of an existing surveying rod and that a tip, for example a standard tip, can be screwed to the second end portion of the post. It is obvious that a damaged tip can easily be replaced by a new tip without replacing the dampening device itself. Moreover, existing standard tips and extensions can still be used.

It is obvious that the characteristics of the elastic dampening member may be determined in advance in view of the load to be supported by the surveying rod. In particular, the preload of the dampening member has to be higher than the load of the system to be damped, i.e. the weight of the measurement equipment. Hence, when the measurement device is supported on the rod in a stable state, i.e. without vibration etc., the dampening element to which a preload of approximately the weight of the measurement device has been applied is uncompressed.

It is conceivable that a specific dampening device comprising a specific elastic dampening member is provided and the appropriate dampening device is chosen in dependence on the measurement equipment. For example, the dampening force and properties of the dampening member are determined by the elasticity and the dimensions of the dampening member, in particular in the longitudinal direction.

The idea underlying the present invention is to provide a dampening member which is disposed inside a surveying rod. A second member, i.e. the post, which is connected to the tip to be placed on the ground presses onto the dampening member, if the rod "drops" on the ground, so that the dampening member is compressed and, thus, the vibration or shock is dampened. Upon vibration, the first member, i.e. the tubular member, and the second member, i.e. the post, slide relative to each other in the longitudinal direction. The dampening member positioned in direct or indirect contact to the first and second members is compressed and exerts a counter-force and, thus, smoothly dampens and stops sliding, so that no hard impact is transferred to the measurement equipment.

It is regarded as obvious that, once the surveying rod is set on the ground, also vibrations from the bottom, in case of an unstable basis, for example, can be dampened and that, thus, the dampening device also works "in the opposite direction".

Further embodiments of the present invention are defined in the dependent claims to which reference is made in the following.

Preferably, an electronic sensor is disposed inside the dampening device, in particular at one end of the dampening member, for detecting the placement of the surveying rod on the ground. For example, the electronic sensor can be placed on the dampening member at the end in the longitudinal direction which is opposite to the post. Hence, it can easily be detected whether the surveying rod is placed on the ground and whether the measurement may be started. Electronic sensors are disclosed in U.S. Pat. No. 6,853,909 B2, for example.

Further, the dampening member may be disposed inside a pan which is integrally formed at the first end of the tubular member and may form part of the first member, so that a cylinder closed at one end and accommodating the dampening member is formed. These features allow for easy construction and arrangement of the elastic dampening member inside the tubular member for different system weights.

An abutting element facing the dampening element may be formed at the first end portion of the post for abutting against the dampening element. In other words, the abutting element closes the cylinder formed by the pan and forces compression of the dampening element if vibrations are caused to the tubular member due to the fixed location of the post relative to the ground.

Moreover, an end stop may be provided at the tubular member which abuts against the abutting element upon certain predetermined, in particular maximum, compression of the dampening member to limit the shift of the tubular member relative to the post in the longitudinal direction and to avoid abutment of the second end of the tubular member against the tip or the second end portion of the post.

Furthermore, an oil-free bushing, preferably made of plastic or metal, may be disposed at least partially between the tubular member and the post. In particular, lubricating grease or oil can be omitted.

Additionally, a seal, in particular a seal ring, may be provided at least partially between the first member (3) and the second member (5), preferably at the inner surface of the tubular member at its second end. The seal allows for providing a waterproof and dustproof dampening device, thereby increasing its lifetime.

Moreover, a surface of the first member and a surface of the second member may at least partially directly or indirectly abut against each other so that substantially no radial play is present between the first member and the second member during sliding. In particular, the inner surface of the tubular member and the outer surface of the post may directly or indirectly abut against each other, so that substantially no radial play is present between the tubular member and the post during sliding. The long guiding length in the longitudinal direction of the tubular member and the post eliminates tilting of the tip and the surveying rod and allows for accurate measurements.

In particular, the tubular member and the post may overlap at least in one state for at least a length of 2, preferably 3, times the shortest distance from the perimeter of the post to the geometric center of the post, viewed in a cross-section perpendicular to the longitudinal direction (L), to provide sufficient stability. The geometric center of a two-dimensional geometric shape is considered as the arithmetic mean position of all the points in the shape. The cross-sectional shape or the perimeter of the post is not particularly limited, but is preferably circular. In other words, for a cylindrical post, the overlap is at least 1 to 1.5 times the diameter of the post.

Moreover, the second member, preferably the second end portion of the post, may comprise a thread, preferably a standard thread ⅝-11", for connection to a tip, preferably a standard tip ⅝-11". The thread at the second end portion of the post allows for using any commonly used tip together with the dampening device.

Further, the dampening member may have a length of at least 10 mm in the longitudinal direction in the uncompressed state, preferably about 10 to 80 mm, more preferably 20 to 40 mm. Additionally or alternatively, the length of the dampening member may be at least the diameter of the cylindrical post. In particular, experiments showed that it is possible to reduce the acceleration caused upon placing a measurement device of about 5 kg supported on the rod comprising the dampening device on the ground to less than 30 g, when it is assumed that the surveying rod is dropped from a height of about 4 cm.

Further, the dampening device, in particular the dampening member, is adaptable to the weight of a measurement device which is to be supported by the surveying rod at the end opposite to the end of the surveying rod which is to be placed on the ground. In particular, the elasticity and/or length of the dampening member can be adjusted in view of the system to be supported by the surveying rod.

The dampening device may comprise a preload element, preferably a screw, more preferably a screw extending in the longitudinal direction and passing through the dampening member, for adjusting the preload of the dampening member. Hence, the same dampening device may be used in connection with measurement devices having different weights.

In one embodiment, the dampening member is preloaded prior to the installation of the dampening device on the rod. The screw head is accommodated inside the rod upon installation of the dampening device in the rod.

Alternatively, in another embodiment, the preload of the dampening member can be adjusted after installation of the dampening device at the rod by removal of the tip since the screw head is arranged inside the thread for connection to the tip and removal of the tip allows for access to the screw head.

Further, the second member may at least partially surround the first member and/or the first member may at least partially surround the second member. This allows for more reliably moving the first and second members to each other.

It is conceivable that the first and/or second members are at least partially surrounded by the rod or that the rod surrounds at least partially the first and/or second member.

The rod and the tubular member may be formed integrally. In other words, the rod may include the tubular member, and no additional or separate tubular member is needed.

Moreover, the dampening member may consist of silicon rubber and/or natural rubber or mainly comprise silicon rubber. Preferably, the surveying rod is made of carbon fibre or aluminum.

Further features and advantages of the present invention will become obvious in view of the following detailed description and the accompanying figures.

DETAILED DESCRIPTION

A plurality of embodiments and modifications are described in the following.

Figure 1:
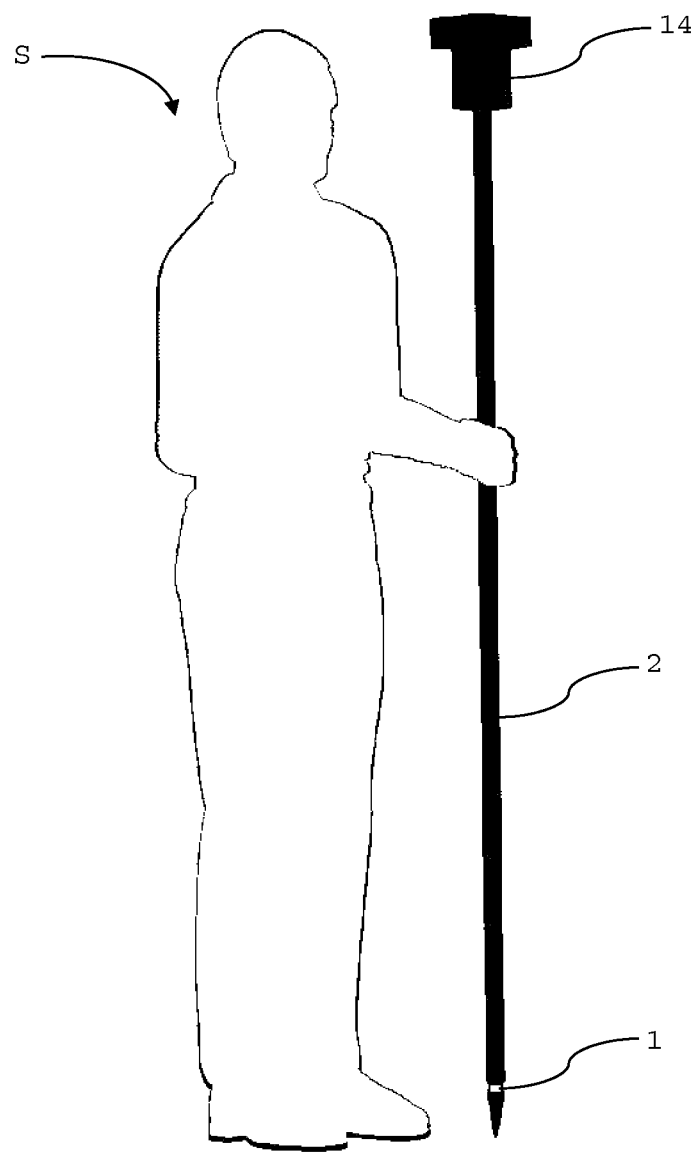
FIG. 1 shows a surveyor, a surveying rod according to the invention and a measurement device.

FIG. 1 shows a surveyor S holding a surveying rod 2. On top of the surveying rod 2, a measurement device 14 is mounted. At the opposite end of the rod 2, a dampening device 1 is provided.

Figures 2A, 2B:
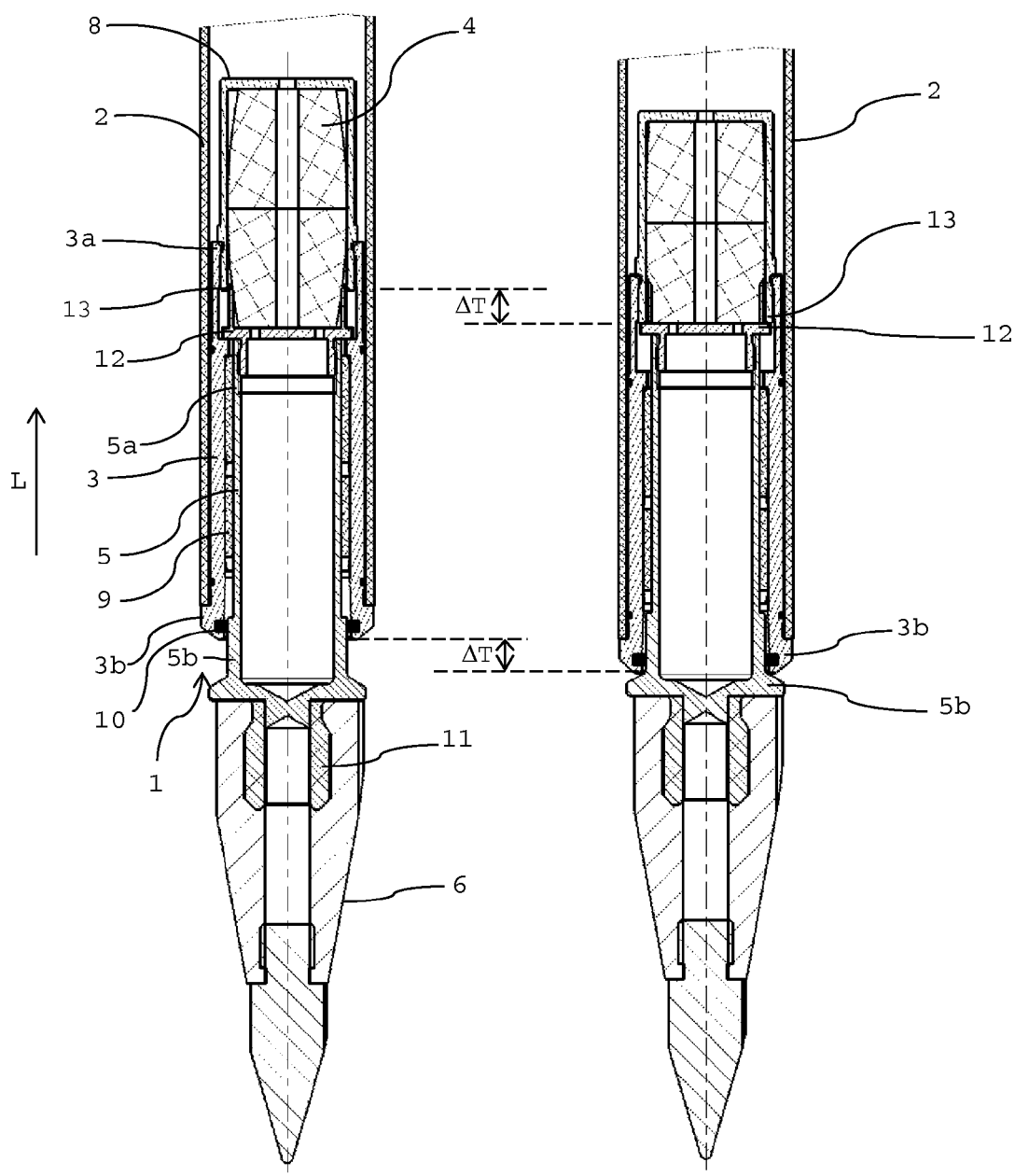
FIG. 2a shows a cross section of the surveying rod according to a first embodiment of the invention comprising a tip, in the uncompressed state.
FIG. 2b shows a cross section of the surveying rod according to the first embodiment of the invention comprising a tip, in the compressed state.

FIG. 2a shows a dampening device 1 according to the first embodiment which is disposed at the lower end of a surveying rod 2. The tubular member 3 has first 3a and second 3b ends which define a longitudinal direction L. The first end 3a of the tubular member is positioned inside the surveying rod 2 and the second end 3b of the tubular member is positioned at the lower end of the surveying rod 2 at which a tip 6 is arranged for placement on the ground.

Further, an elastic dampening member 4 consisting of two parts is disposed at the first end 3a of the tubular member. A post 5 having first 5a and second 5b end portions and being at least partially surrounded by the tubular member 3 and slidable in the longitudinal direction L inside the tubular member 3 is provided. Moreover, the first end portion 5a of the post abuts on the elastic dampening member 4. The second end portion 5b of the post projects from the second end 3b of the tubular member and is connected to a tip 6 by means of the thread 11.

In FIG. 2a, the surveying rod 2, i.e. the dampening device 1, is in the uncompressed state and the dampening member is not compressed. When the preloaded elastic dampening member, i.e. when the measurement device is supported on the rod, is uncompressed, a travel distance $\Delta T$, i.e. a possible shift in the longitudinal direction, exists between the tubular member 3 and the post 5 in the longitudinal direction.

In comparison, in FIG. 2b, the compressed state is shown where the elastic dampening member is compressed, since the rod has just been placed on the ground. As shown in FIGS. 2a and 2b, the tip 6 and the post 5 can be regarded as fixed on the ground and the surveying rod 2 and the tubular member 3 are slid further on the post 5 upon exertion of shock or vibration to the surveying rod.

Compression, i.e. the reduction of length of the dampening member in the longitudinal direction, corresponds to the travel length $\Delta T$ of the surveying rod 2 and the tubular member 3 relative to the post 5 and the tip 6. In total, the dampening member 4 has a length of about 10 to 80 mm in the longitudinal direction in the uncompressed and assembled state of the dampening device 1. The dampening member 4 consists of silicon rubber and its elasticity is about 50 Shore A.

The position of the abutting element 12 which is attached to the upper end 5a of the post 5 remains unchanged in relation to the post and the tip upon compression, i.e. it is integrated with the post 5 for abutting against the dampening element 4.

An end stop 13 is provided for limiting the travel length $\Delta T$ in case that the counter-force of the elastic dampening member against the force exerted by the vibration is not sufficient. The maximum travel length $\Delta T$ as shown in FIGS. 2a and 2b is determined by the distance of the upper surface of the abutting element 12 and the lower surface of the end stop 13 in the longitudinal direction.

Figure 3:
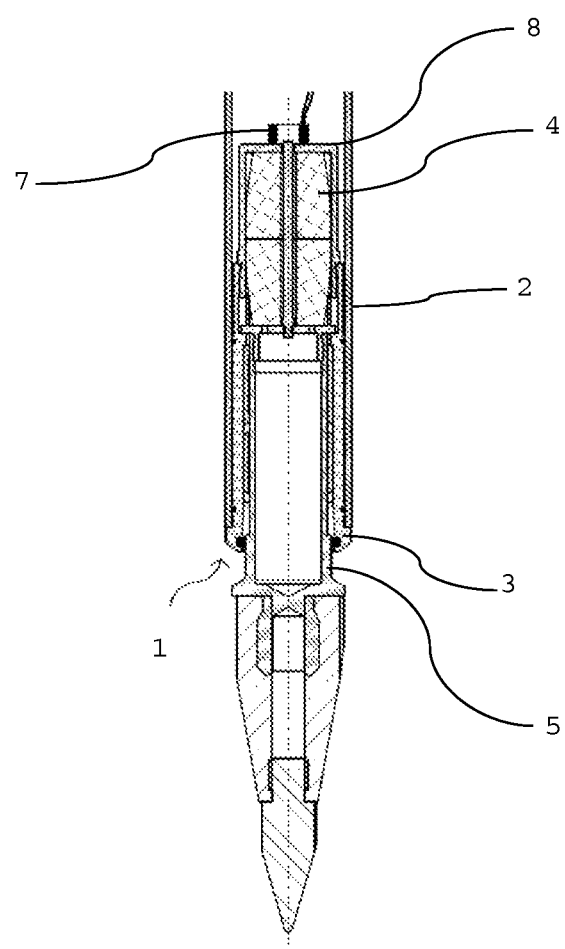
FIG. 3 shows a cross section of the surveying rod according the first embodiment of to the invention comprising a tip and an electronic sensor for detecting the placement of the surveying rod on the ground.

Further, FIG. 3 shows the electronic sensor 7 which is disposed inside the damping device 1. In this modification, the sensor is disposed above the dampening member 4 in the longitudinal direction.

Furthermore, the pan 8 is provided and integrated with the first end 3a of the tubular member so that a cylinder which is closed at one end and accommodates the dampening member 4 is formed.

As shown in the figures, a seal ring 10 is provided at the inner surface of the tubular member at its second end 3b for preventing entrance of water and dust, for example.

Further, the tubular member 3 and the post 5 have a cylindrical shape, and the inner surface of the tubular member 3 and the outer surface of the post 4 indirectly abut against each other so that substantially no radial play exists between the tubular member and the post during sliding. The overlap between the tubular member 3 and the post 5 is approximately 1 to 1.5 times the diameter of the post 5.

An oil-free plastic bushing 9 is disposed at the inner surface of the tubular member 3 for guiding the tubular member 3 and the post 5.

Figures 4A, 4B:
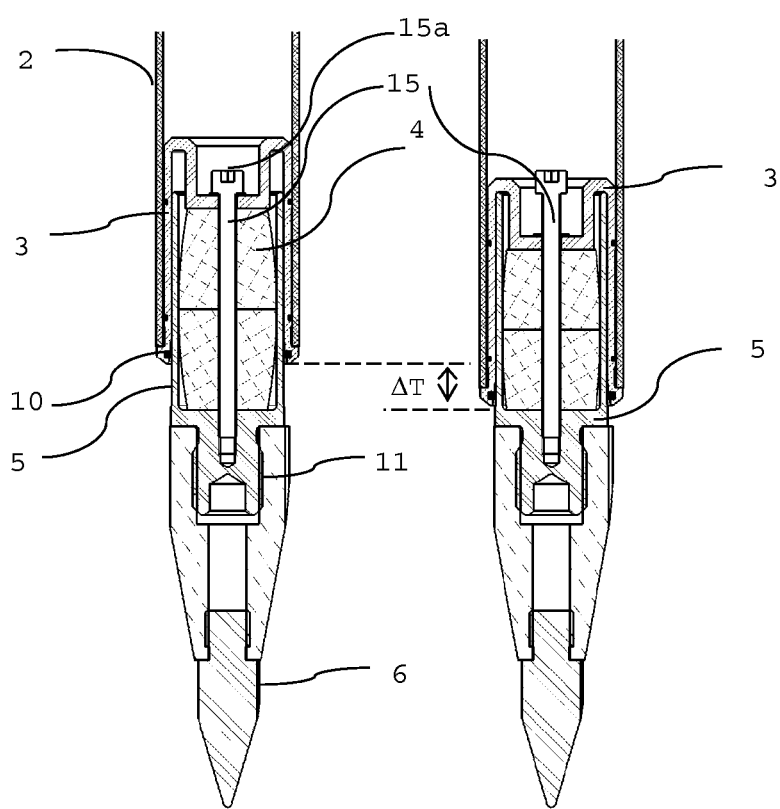
FIG. 4a shows a cross section of the surveying rod according to a second embodiment of the invention comprising a tip, in the uncompressed state.
FIG. 4b shows a cross section of the surveying rod according to the second embodiment of the invention comprising a tip, in the compressed state.

FIGS. 4a and 4b relate to the second embodiment of the present invention. A screw 15 acting as an adjustable preload element is provided. Prior to installing the dampening device inside the rod 2, the preload of the dampening member 4 can be adjusted by moving the screw. The dampening member 4 is surrounded by the post 5. As shown in FIGS. 4a and 4b, the screw 15 passes through the dampening member 4 and is arranged such that the dampening member is pre-compressed by fixing the screw in a particular position with respect to the second member 5. Having installed the dampening device at the rod 2, the screw head 15a is disposed inside the rod 2 and no access to the screw head is possible.

Figures 5A, 5B:
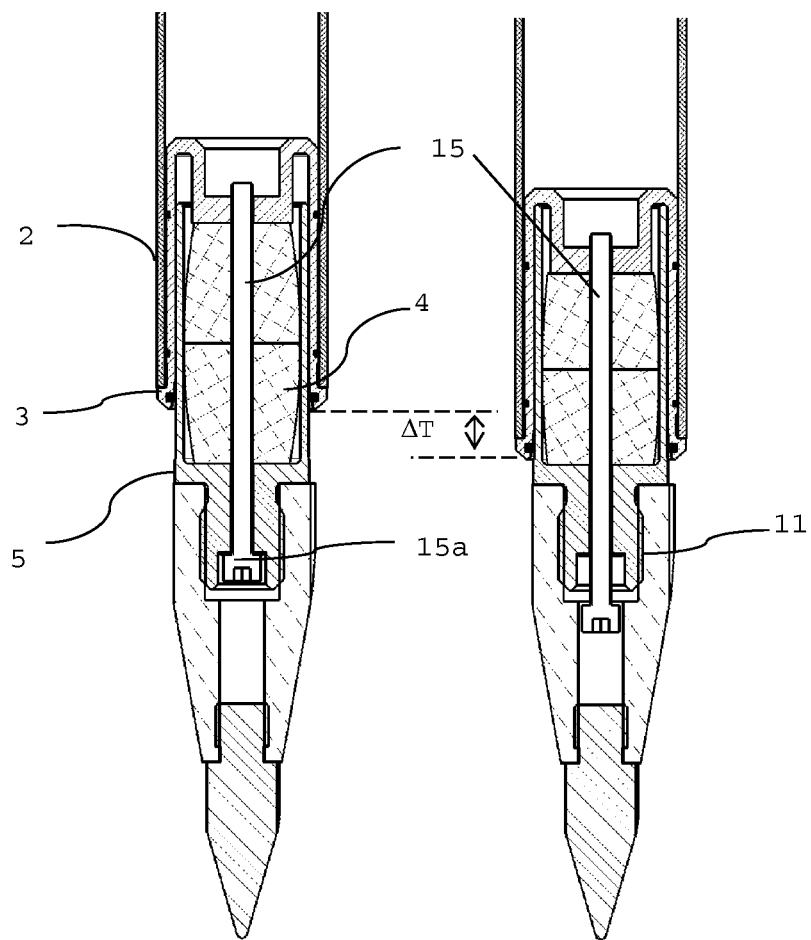
FIG. 5a shows a cross section of the surveying rod according to a third embodiment of the invention comprising a tip, in the uncompressed state.
FIG. 5b shows a cross section of the surveying rod according to the third embodiment of the invention comprising a tip, in the compressed state.

In the third embodiment, as shown in FIGS. 5a and 5b, the orientation of the screw 15 is changed. The screw head 15a is at the end of the second member which comprises the thread 11 for connection to the tip 6 and accessible after removal of the tip 6. Hence, even after installation of the dampening device at the rod 2, the preload of the tip can be adjusted.

In the second and third embodiments, the dampening member 4 is disposed inside the second member 5, forming a pan-like structure. In the first embodiment, the dampening member 4 is accommodated inside the first member 3, in particular pan 8.

Figures 6A, 6B:
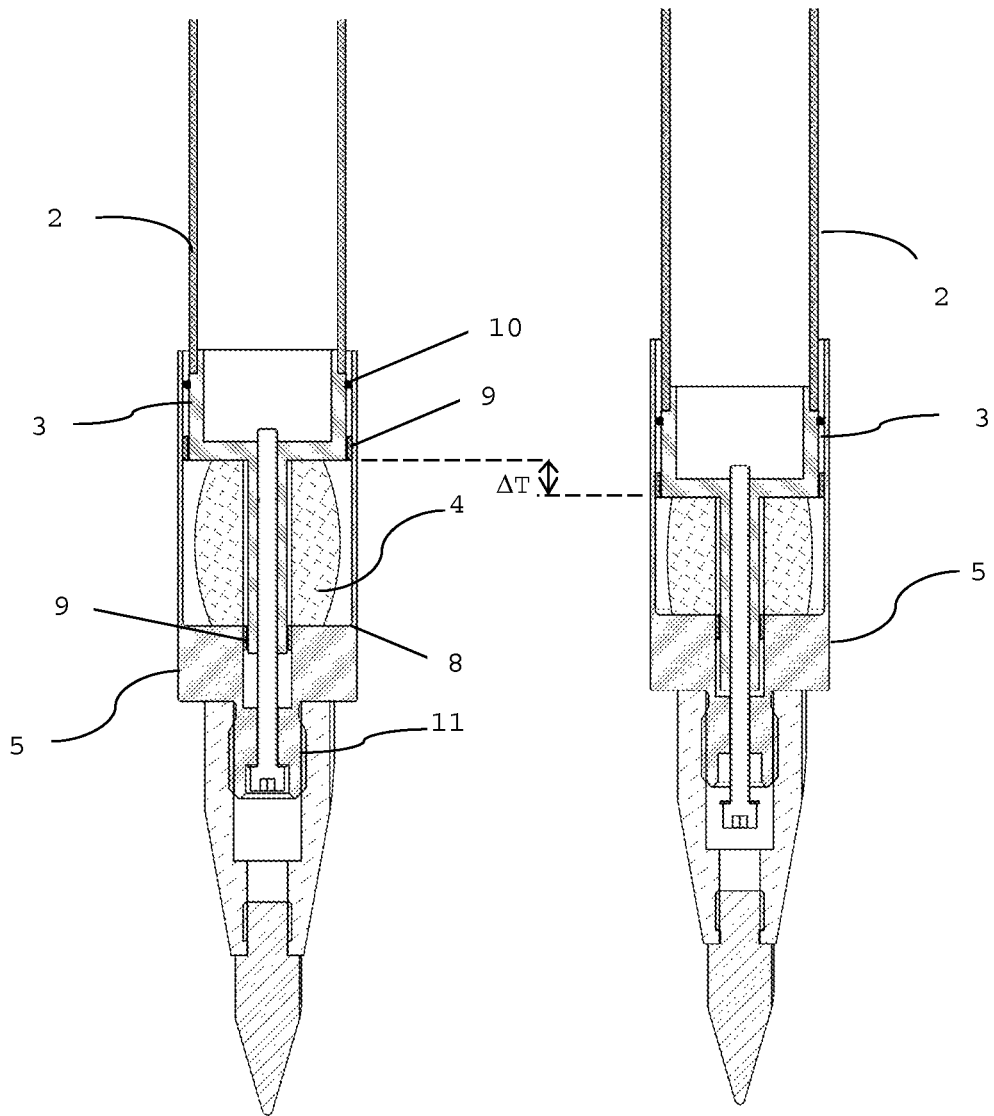
FIG. 6a shows a cross section of the surveying rod according to a fourth embodiment of the invention comprising a tip, in the uncompressed state.
FIG. 6b shows a cross section of the surveying rod according to the fourth embodiment of the invention comprising a tip, in the compressed state.

In the fourth embodiment, as shown in FIGS. 6a and 6b, the second member 5 partially surrounds the first member 3 and the rod 2. The arrangement of the screw 15 corresponds to that described in connection with the third embodiment.

In the fourth embodiment, as depicted in FIGS. 6a and 6b, the rod 2 and the tubular member 3 are partially surrounded by the post 5. It is shown that the tubular member 3 projects from the end of the rod 2. It is conceivable that the tubular member 3 is inside or outside of the rod 2.

The features described in connection with one of the embodiments may also be realized in connection with any of the other embodiments, as far as technically possible. In particular, any of the embodiments may comprise an electronic sensor. Further, in any embodiment, the first and/or second members 3, 5 may be outside or inside the rod 2, and the first member may surround the second member or vice versa.

The invention claimed is:

1. A dampening device for a surveying rod, the device comprising
    a first member, preferably a tubular member, which is to be positioned at the end of the surveying rod which is to be directed to the ground,
    a second member, preferably a post, being at least partially slidable directly or indirectly along the first member in a longitudinal direction and for being directly or indirectly connected to a tip which is to be placed on the ground,
    wherein the first and second members overlap at least in one position at least partially along the longitudinal direction, and
    at least one elastic dampening member which is directly or indirectly housed by the first and/or second member and disposed such that it is compressed by a movement of the first member and the second member relative to each other in the longitudinal direction,
    so that mechanical shock exerted to the surveying rod and/or the tip can be dampened by elastic deformation of the dampening member.

2. The dampening device according to claim 1, wherein an electronic sensor is disposed inside the dampening device, preferably at one end of the dampening member, for detecting the placement of the surveying rod on the ground.

3. The dampening device according to claim 1, wherein the tubular member has first and second ends which define a longitudinal direction,
    wherein the first end of the tubular member is to be positioned inside the surveying rod and
    the second end of the tubular member is to be positioned at the end of the surveying rod which is to be directed to the ground,
    the at least one elastic dampening member is disposed at the first end of the tubular member and
    the post has first and second end portions and is at least partially surrounded by the tubular member and slidable in the longitudinal direction inside the tubular member,
    wherein the first end portion of the post directly or indirectly abuts the elastic dampening member and
    the second end portion of the post projects from the second end of the tubular member for being directly or indirectly connected to a tip which is to be placed on the ground.

4. The dampening device according to claim 3, wherein the dampening member is disposed inside a pan formed at the first end of the tubular member so that a cylinder closed at one end and accommodating the dampening member is formed and/or
    wherein an abutting element facing the dampening element is formed at the first end portion of the post for abutting against the dampening element and/or
    wherein the tubular member comprises an end stop which directly or indirectly abuts against the post upon a predetermined compression of the dampening member.

5. The dampening device according to claim 1, wherein an oil-free bushing is disposed at least partially between the first member and the second member.

6. The dampening device according to claim 1, wherein a seal is provided disposed at least partially between the first member and the second member.

7. The dampening device according to claim 1, wherein a surface of the first member and a surface of the second member abut at least partially directly or indirectly against each other along the longitudinal direction, so that substantially no radial play is present between the first member and the second member during sliding.

8. The dampening device according to claim 1, wherein the first member and the second member overlap in the longitudinal direction at least in one state for at least a length of 2, preferably 3, times the shortest distance from the perimeter of the second member to the geometric center of the second member, viewed in a cross-section perpendicular to the longitudinal direction.

9. The dampening device according to claim 1, wherein the second member comprises a thread, preferably a standard thread, for connection to a tip, preferably a standard tip.

10. The dampening device according to claim 1, wherein the dampening member has a length in the longitudinal direction of at least about 10 mm, preferably about 10 to 80 mm, more preferably 20 to 40 mm and/or consists of silicon rubber and/or natural rubber.

11. The dampening device according to claim 1, wherein the dampening device, in particular the dampening member, is adaptable to the weight of a measurement device which is to be supported by the surveying rod at the end opposite to the end of the surveying rod which is to be placed on the ground.

12. The dampening device according to claim 11, wherein the dampening device comprises a preload element, preferably a screw, more preferably a screw extending in the longitudinal direction and passing through the dampening member, for adjusting the preload of the dampening member.

13. The dampening device according to claim 1, wherein the second member at least partially surrounds the first member and/or the first member at least partially surrounds the second member.

14. A surveying rod for supporting a measurement device at one end of the rod, the rod
comprising the dampening device according to claim 1 at the other end.

15. A surveying rod according to claim 14, wherein the rod and the tubular member are integrally formed.

\* \* \* \* \*